US012566144B2

(12) United States Patent
Shin et al.

(10) Patent No.: US 12,566,144 B2
(45) Date of Patent: Mar. 3, 2026

(54) SEMICONDUCTOR INSPECTION APPARATUS

(71) Applicant: SAMSUNG ELECTRONICS CO., LTD., Suwon-si (KR)

(72) Inventors: Junho Shin, Suwon-si (KR); Wookrae Kim, Suwon-si (KR); Hyungjin Kim, Suwon-si (KR); Seungbeom Park, Suwon-si (KR); Jangwoon Sung, Suwon-si (KR); Myungjun Lee, Suwon-si (KR); Hojun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 120 days.

(21) Appl. No.: 18/774,519

(22) Filed: Jul. 16, 2024

(65) Prior Publication Data

US 2025/0198945 A1     Jun. 19, 2025

(30) Foreign Application Priority Data

Dec. 13, 2023     (KR) ........................ 10-2023-0181162

(51) Int. Cl.
G01N 21/95          (2006.01)
G01N 21/33          (2006.01)
(Continued)

(52) U.S. Cl.
CPC ......... G01N 21/9501 (2013.01); G01N 21/33 (2013.01); G01N 21/47 (2013.01); G01N 21/55 (2013.01)

(58) Field of Classification Search
CPC ........ G01N 21/33; G01N 21/47; G01N 21/55; G01N 21/9501
See application file for complete search history.

(56) References Cited

U.S. PATENT DOCUMENTS 10,748,736 B2     8/2020   Zalubovsky
10,859,519 B2    12/2020   Pois et al.
(Continued)

FOREIGN PATENT DOCUMENTS

WO      WO2023072573 A1      5/2023

OTHER PUBLICATIONS

Shanblatt, et al., "Quantitative Chemically Specific Coherent Diffractive Imaging of Reactions at Buried Interfaces with Few Nanometer Precision" ACS Publications, Nano Lett., Jul. 22, 2016; 8 pages.

(Continued)

*Primary Examiner* — Kevin K Pyo

(74) *Attorney, Agent, or Firm* — Morgan, Lewis & Bockius LLP

(57)          ABSTRACT

A semiconductor inspection apparatus includes a light source portion configured to output a first beam, an extreme-ultraviolet filter disposed in a path of the first beam output from the light source portion and configured to separate extreme-ultraviolet light from the first beam, and an inspection portion including a detector apparatus configured detect scattered light, wherein the inspection portion further includes an inspection portion optical system comprising a variable mirror module disposed in a path of the extreme-ultraviolet light.

20 Claims, 12 Drawing Sheets

(51) Int. Cl.
    *G01N 21/47*         (2006.01)
    *G01N 21/55*         (2014.01)

(56)               References Cited

U.S. PATENT DOCUMENTS

| | | |
|---|---|---|
| 11,391,677 B2 * | 7/2022 | Witte ................... G01J 1/4257 |
| 2017/0336198 A1 | 11/2017 | Adel et al. |
| 2019/0155171 A1 | 5/2019 | Lin et al. |
| 2022/0390388 A1 | 12/2022 | Smorenburg |
| 2023/0280660 A1 | 9/2023 | Bauerschmidt et al. |

OTHER PUBLICATIONS

Groot, "Principles of interference microscopy for the measurement of surface topography", in Advances in Optics and Photonics 7, published Feb. 2, 2015, found on the internet at http://dx.doi.org/10.1364/AOP.7.000001, pp. 1-65.

* cited by examiner

FIG. 2

[Tunnable HHG source]

(a)

(b)

[EUV mirror changer]

(c)

(d)

[Generated spectrum]

(e)

(f)

(g)

SEMICONDUCTOR INSPECTION APPARATUS

CROSS-REFERENCE TO RELATED APPLICATION

This application is based on and claims priority under 35 U.S.C. § 119 to Korean Patent Application No. 10-2023-0181162, filed on Dec. 13, 2023, in the Korean Intellectual Property Office, the disclosure of which is incorporated by reference herein in its entirety.

BACKGROUND

1. Technical Field

The inventive concept relates to a semiconductor inspection apparatus, and more particularly to a semiconductor inspection apparatus having a plurality of modes.

2. Discussion of Related Art

The use of extreme ultraviolet (EUV) light for manufacturing semiconductor devices has been proposed in order that lithography technologies may be improved to produce fine features in semiconductor devices. With the capability to produce these fine features, there is a need for an apparatus that provides high-resolution imaging, inspection, and measurement of the structure and physical properties of the semiconductor devices.

SUMMARY

The inventive concept provides a semiconductor inspection apparatus with improved flexibility.

The inventive concept provides a semiconductor inspection apparatus that may perform a number of different processes.

According to an aspect of the inventive concept, a semiconductor inspection apparatus includes a light source portion configured to output a first beam, an extreme-ultraviolet filter disposed in a path of the first beam output from the light source portion, and configured to separate extreme-ultraviolet light from the first beam, and an inspection portion including a detector apparatus configured detect scattered light, wherein the light source portion includes a laser source configured to output the first beam, a second-harmonic generation crystal disposed in a path of the first beam and configured to separate, from the first beam, a second beam having a different wavelength band from the first beam, and a gas cell disposed in the path of the first beam and a path of the second beam and configured to supply a gas in the path of the first beam and the path of the second beam to generate the extreme-ultraviolet light, wherein the inspection portion further includes an inspection portion optical system including a variable mirror module disposed in a path of the extreme-ultraviolet light.

According to another aspect of the inventor concept, a semiconductor inspection apparatus includes a laser source configured to output a first beam having a first wavelength band, a second-harmonic generation crystal configured to separate, from the first beam, a second beam having a second wavelength band that having about half a range of the first wavelength band, a gas cell configured to contain a gaseous medium in a path of the first beam and the second beam, an extreme-ultraviolet filter configured to separate extreme-ultraviolet light from the first beam and the second beam, which have passed through the gas cell, a variable mirror module disposed in a path of the extreme-ultraviolet light, a condensing mirror configured to concentrate, on an upper surface of a substrate, the extreme-ultraviolet light incident from the variable mirror module, and a detector apparatus configured to detect at least a portion of the extreme-ultraviolet light scattered from the substrate, wherein the laser source is configured to output the first beam in a mode selected from a plurality of modes, and the plurality of modes comprise a frequency comb mode, which is a discontinuous pulse, and a continuum mode.

According to another aspect of the inventive concept, a semiconductor inspection apparatus includes a light source portion configured to output a plurality of light beams, an extreme-ultraviolet filter disposed in a path of the plurality of light beams output from the light source portion, and configured to separate extreme-ultraviolet light from the plurality of light beams, and an inspection portion including a condensing mirror configured to concentrate the extreme-ultraviolet light on a substrate and a detector apparatus configured to detect light scattered from the substrate, wherein the light source portion includes a laser source configured to output a first beam having a first wavelength band, a second-harmonic generation crystal configured to separate, from the first beam, a second beam having a second wavelength band that is half of the first wavelength band, a gas cell containing a gaseous medium disposed in a path of the first beam and the second beam to generate the extreme-ultraviolet light, and a light source portion optical system disposed in a path of the first beam, the light source portion optical system includes a first mirror configured to polarize the first beam, and a second mirror configured to scan, into the gaseous medium, the first beam reflected from the first mirror, the inspection portion further includes a sample stage on which the substrate is disposed, a detector stage on which the detector apparatus is disposed, a control unit configured to control the sample stage and the detector stage, and a variable mirror module disposed in a path of the extreme-ultraviolet light, wherein the sample stage and the detector stage are each configured to be movable in a first direction, a second direction perpendicular to the first direction, and a vertical direction perpendicular to the first direction and the second direction, a mirror mounted on the variable mirror module includes either a narrow band mirror or a broadband mirror, and the extreme-ultraviolet light separated by the extreme-ultraviolet filter has a wavelength band between about 10 nanometers and about 20 nanometers and has a period between about 10 femtoseconds and about 90 femtoseconds.

BRIEF DESCRIPTION OF THE DRAWINGS

Embodiments will be more clearly understood from the following detailed description taken in conjunction with the accompanying drawings in which:

FIG. 2 is an enlarged conceptual diagram of a region A of FIG. 1;

DETAILED DESCRIPTION

Figure 1:
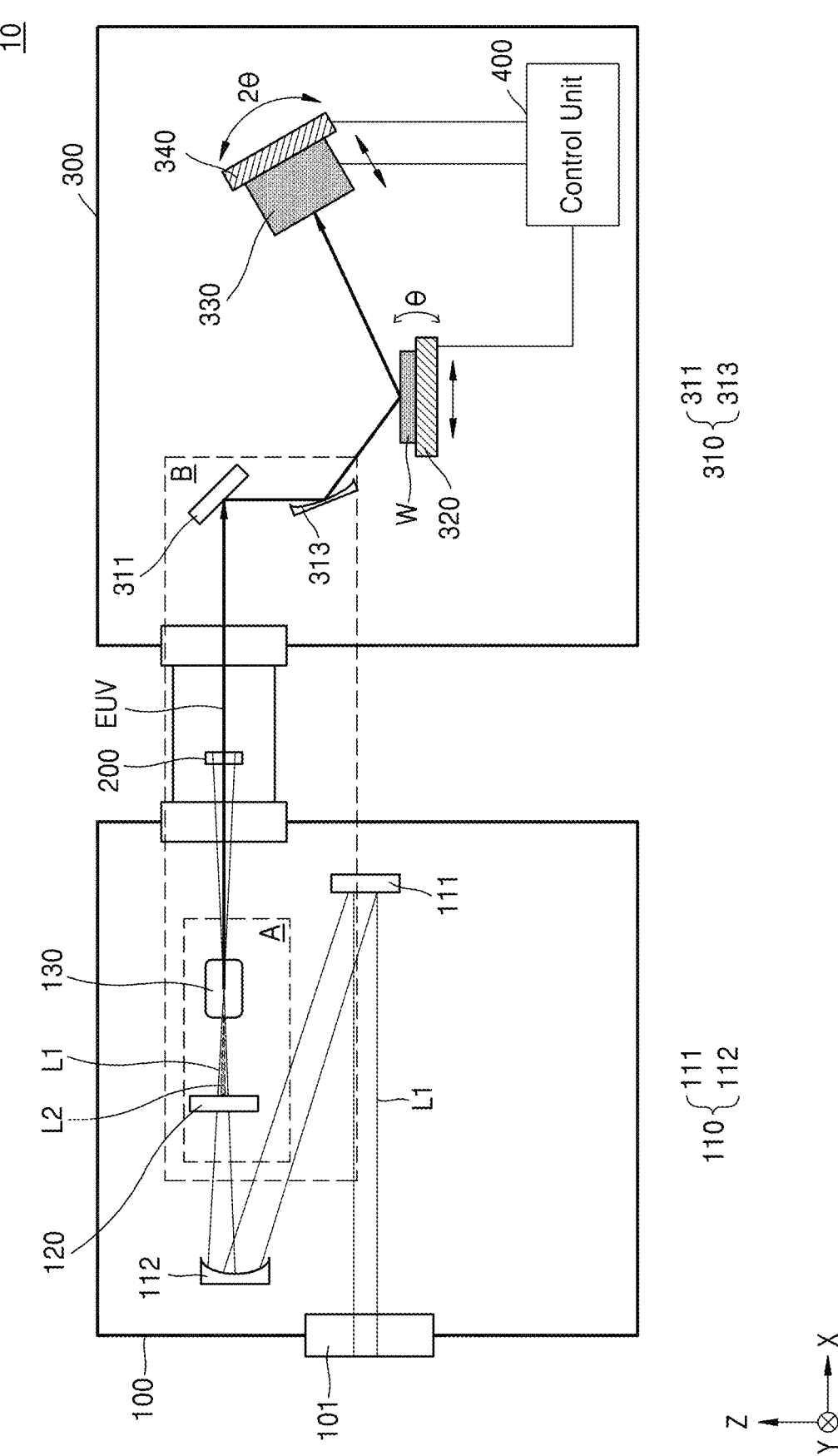
FIG. 1 is a conceptual diagram of a semiconductor inspection apparatus according to an embodiment.

Hereinafter, embodiments will be described in detail with reference to the accompanying drawings. The same reference numerals may be used for the same components in the drawings, and redundant descriptions thereof may be omitted.

The disclosure allows for various changes and numerous embodiments, specific embodiments will be illustrated in the drawings and described in detail in the written description. However, this is not intended to limit embodiments to particular modes of practice, and it is to be appreciated that all changes, equivalents, and substitutes that do not depart from the spirit and technical scope of the inventive concept are encompassed by the disclosure. In the disclosure, certain detailed descriptions may be omitted when they serve to obscure the essence of the inventive concept.

The use of examples or illustrative terms may be merely for describing the inventive concept in detail, and thus, the scope of the inventive concept may not be limited by these examples or illustrative terms unless limited by the claims.

Hereinafter, unless otherwise specified, throughout the specification, a vertical direction is defined as a Z direction, and a first direction and a second direction each be defined as a vertical direction perpendicular to the Z direction. The first direction may be referred to as the X direction, and the second direction may be referred to as the Y direction. A vertical level may refer to a height level in a vertical direction (Z direction). A horizontal width may refer to a length in a horizontal direction (X direction and/or Y direction), and a vertical length may refer to a length in the vertical direction (Z direction).

FIG. 1 is a conceptual diagram of a semiconductor inspection apparatus according to an embodiment.

Referring to FIG. 1, a semiconductor inspection apparatus 10 may include a light source portion 100. The light source portion 100 may output a beam of light. For example, the light source portion 100 may output a plurality of beams, and the plurality of beams may have different wavelength bands.

The light source portion 100 may include a laser source 101. The laser source 101 may output a first beam L1. The first beam L1 may be infrared (IR) light with a wavelength band around about 800 nanometers (nm), for example, a wavelength band between about 700 nm and 1 millimeter (mm). The light source portion 100 may include a light source portion optical system 110 disposed in a path of the first beam L1. The light source portion optical system 110 may include a first mirror 111, a second mirror 112, and a gas cell 130. The first mirror 111 may be configured to polarize the first beam L1. The second mirror 112 may be configured to concentrate, on the gas cell 130, the first beam L1 reflected from the first mirror 111. The gas cell 130 may be disposed in a traveling path of the first beam L1 and a second beam L2, and may be configured to supply gas that collides with the first beam L1 and the second beam L2 to generate a harmonic radiation. The harmonic radiation of the inventive concept may be extreme-ultraviolet (EUV) light or soft X-rays.

The laser source 101 may generate and output a pulse laser beam. For example, the laser source 101 may include a Nd:YAG laser oscillator. The laser source 101 may generate and output, for example, a femtosecond (fs) laser beam or a picosecond (ps) laser beam. In this regard, a laser beam may have a pulse length of about 1 fs to about 1 ps. However, the pulse length of the laser beam is not limited to the above-described range.

The laser beam may have visible and/or IR wavelengths. For example, the laser beam may have a near-infrared (NIR) wavelength. In the semiconductor inspection apparatus 10, the first beam L1 generated from the laser source 101 may be IR light having a wavelength of about 800 nm. A frequency or wavelength of the first beam L1 may differ depending on the laser source 101, and an amplitude and/or pulse frequency of the first beam L1 may be determined by a signal generated from a function generator.

The first mirror 111 may reflect the first beam L1 toward the second mirror 112. The first mirror 111 may polarize the first beam L1 emitted from the laser source 101. A polarization of the first beam L1 may depend on a polarizing film attached to the first mirror 111. For example, a direction in which the first beam L1 oscillates may depend on a polarization direction of the polarizing film attached to the first mirror 111. Polarization components of the first beam L1 may respectively impart an s-polarization or a p-polarization to light, and may differ depending on the properties of a substrate W to be inspected or a measurement method. Although not shown in the drawings, at least one polarizing film that functions as a polarizer may be attached to the first mirror 111. A polarizing film may be a linear polarizing film.

The second mirror 112 included in the light source portion optical system 110 may have a curved surface that concentrates the incident first beam L1. The second mirror 112 may concentrate the incident first beam L1 on a focal point. The focal point of the second mirror 112 may be located within the gas cell 130. For example, the focal point of the second mirror 112 may be located on a gaseous medium within the gas cell 130 included in the light source portion 100.

The light source portion 100 may include a second-harmonic generation (SHG) crystal 120. The SHG crystal 120 may be disposed in a path of the first beam L1. The SHG crystal 120 may separate the second beam L2 from the first beam L1. The second beam L2 may have a different wavelength band from the first beam L1. SHG is a non-linear effect in which light may be emitted from a crystal at a reflected angle with about twice the frequency of an incident light beam. In an embodiment, a wavelength band of the second beam L2 separated from the first beam L1 that has passed through the SHG crystal 120 may be smaller (e.g., narrower) than a wavelength band of the first beam L1. The wavelength band of the second beam L2 may be about 400 nm. The wavelength band of the first beam L1 may be about twice the range of the wavelength band of the second beam L2. A portion of the first beam L1 may pass, intact, through the SHG crystal 120. Accordingly, a beam output after passing through the SHG crystal 120 may include the first beam L1 and the second beam L2. The first beam L1 and the second beam L2, which have passed through the SHG crystal 120, may be scanned into the gas cell 130. The SHG crystal 120 may be a crystal including beta barium borate (BBO).

In an embodiment, the first beam L1 and the second beam L2 may each be focused light. A focal point of the first beam L1 and a focal point of the second beam L2 may each be on the gaseous medium within the gas cell 130. Each of the first beam L1 and the second beam L2 may have a pulse width (for example, measured at full width at half maximum (FWHM)) of about 10 femtoseconds to about 90 femtoseconds and a pulse energy of several mJ near the focal point. The first beam L1 and the second beam L2 may form a strong electric field with an intensity of about 1015 W/cm2 or more in a gaseous medium GAS (of FIG. 2). The strong electric field formed in the gaseous medium GAS (of FIG. 2) by the first beam L1 and the second beam L2 may ionize the gaseous medium, and as ionized electrons recombine with corresponding cations, kinetic energy obtained during the electrons' flight time may be released in the form of light.

The semiconductor inspection apparatus 10 may include an EUV filter 200. The EUV filter 200 may be disposed in a path of a beam output from the light source portion 100. The EUV filter 200 may separate EUV light EUV from the beam. The beam may include the first beam L1 and/or the second beam L2. Accordingly, the EUV filter 200 may separate the EUV light EUV from the first beam L1, and the EUV filter 200 may separate the EUV light EUV from the second beam L2. The EUV light EUV as an output beam generated in the above-described manner may be referred to as a EUV beam via high-order harmonic generation (HHG). The EUV light EUV may be a high-order harmonic component of a wavelength band from about 10 nm to about 20 nm. That is, the EUV light EUV may be an extreme-ultraviolet harmonic radiation, e.g., a broadband EUV continuum via HHG. The EUV light EUV separated by the EUV filter 200 may have pulse width between about 10 femtoseconds to about 90 femtoseconds.

The semiconductor inspection apparatus 10 may optionally include an EUV filter 200. The EUV filter 200 may be disposed in a path of a beam output from the light source portion 100. The EUV filter 200 may be omitted from the path of the beam output from the light source portion 100. For example, in a case where the EUV filter 200 is omitted, the first beam L1 and the second beam L2 may be incident on the variable mirror module 311.

The semiconductor inspection apparatus 10 may include an inspection portion 300. The inspection portion 300 may be used to inspect the properties, such as the thickness, of the substrate W by using the EUV light EUV.

The inspection portion 300 may include an inspection portion optical system 310, a sample stage 320, a detector apparatus 330, a detector stage 340, and a control unit 400. The inspection portion optical system 310 may include a variable mirror module 311 and a condensing mirror 313. The sample stage 320 may support the substrate W. The detector stage 340 may support the detector apparatus 330.

Different types of mirrors may be replaced and mounted on the variable mirror module 311. In an embodiment, a mirror mounted on the variable mirror module 311 may be either a narrow band mirror 311*a* (of FIG. 5) or a broadband mirror 311*b* (of FIG. 6), which are described in detail with reference to FIG. 5 and FIG. 6. The variable mirror module

311 may be disposed in a traveling path of the EUV light EUV separated by the EUV filter 200, and the traveling path of the EUV light EUV may be changed by the mirror mounted on the variable mirror module 311.

The EUV light EUV reflected from the mirror mounted on the variable mirror module 311 may be irradiated to the condensing mirror 313. The condensing mirror 313 may concentrate the EUV light EUV received from the variable mirror module 311 on an upper surface of the substrate W. The condensing mirror 313 may be an ellipsoidal mirror having a three-dimensionally curved surface on which the EUV light EUV may be reflected. The curved shape of the condensing mirror 313 is not limited thereto, and the curvature of the condensing mirror 313 may vary depending on the type of substrate W.

The substrate W may be disposed above the sample stage 320. The substrate W may be a semiconductor substrate. The substrate W may have an upper surface and a lower surface opposite to the upper surface.

In some embodiments, the substrate W may be a semiconductor wafer. In some embodiments, the substrate W may include silicon (Si). In some embodiments, the substrate W may include a semiconductor element, such as germanium (Ge), or a compound semiconductor, such as silicon carbide (SiC), gallium arsenide (GaAs), indium arsenide (InAs), or indium phosphide (InP). In at least one embodiment, the substrate W may have a silicon-on-insulator (SOI) structure. For example, the substrate W may include a buried oxide (BOX) layer. In some embodiments, the substrate W may include a conductive region, for example, an impurity-doped well or an impurity-doped structure. In addition, the substrate W may have various device isolation structures, such as a shallow trench isolation (STI) structure.

In an embodiment, the substrate W may be a silicon bulk wafer, an epitaxial wafer, or the like. The epitaxial wafer may include a crystalline material layer, that is, an epitaxial layer, which is grown on a bulk wafer by using an epitaxial process. However, the substrate W is not limited to a bulk wafer or an epitaxial wafer. For example, the substrate W may include various types of wafers, such as a polished wafer, an annealed wafer, an SOI wafer, etc. The substrate W may include a plurality of semiconductor chips. The substrate W may be separated into individual semiconductor chips via a subsequent singulation process. The semiconductor chips may include patterns that form a semiconductor device. A pattern on the substrate W or a semiconductor chip may be formed via a series of semiconductor processes, such as a photolithography process and/or an etching process.

A plurality of various types of individual devices may be formed on the substrate W. The plurality of individual devices may include various microelectronic devices, such as a metal-oxide-semiconductor field effect transistor (MOSFET), a system large scale integration (LSI), an image sensor such as a complementary metal-oxide-semiconductor (CMOS) imaging sensor (CIS), a micro-electro-mechanical system (MEMS), an active device, a passive device, etc.

The sample stage 320 may support the substrate W, and may be configured to be movable. For example, the sample stage 320 may be movable in a first direction X, a second direction Y perpendicular to the first direction X, and a vertical direction Z perpendicular to the first direction X and the second direction Y. In an embodiment, the sample stage 320 may be configured to be rotatable. For example, the sample stage 320 may be rotatable along an axis of the second direction Y. An angle of the sample stage 320 may vary depending on the properties of the substrate W to be measured and the type of inspection.

The detector apparatus 330 may be a charge-coupled device (CCD) camera. More specifically, the detector apparatus 330 may be a CCD camera configured to detect a wavelength band of the EUV light EUV. The detector stage 340 may support the detector apparatus 330, and may be configured to be movable. For example, the detector stage 340 may be movable in the first direction X, the second direction Y perpendicular to the first direction X, and the vertical direction Z perpendicular to the first direction X and the second direction Y. In an embodiment, the sample stage 320 may be configured to be rotatable. For example, the sample stage 320 may be rotatable along the axis of the second direction Y. The angle may vary depending on the properties of the substrate W to be measured and the type of inspection. In an embodiment, the angle at which the detector stage 340 rotates along the axis of the second direction Y may be about twice, or less than twice the angle at which the sample stage 320 rotates along the axis of the second direction Y.

The control unit 400 may control movement and rotation of the sample stage 320 and the detector stage 340. A description of the control unit 400 is provided in detail with reference to FIG. 12.

Figure 2:
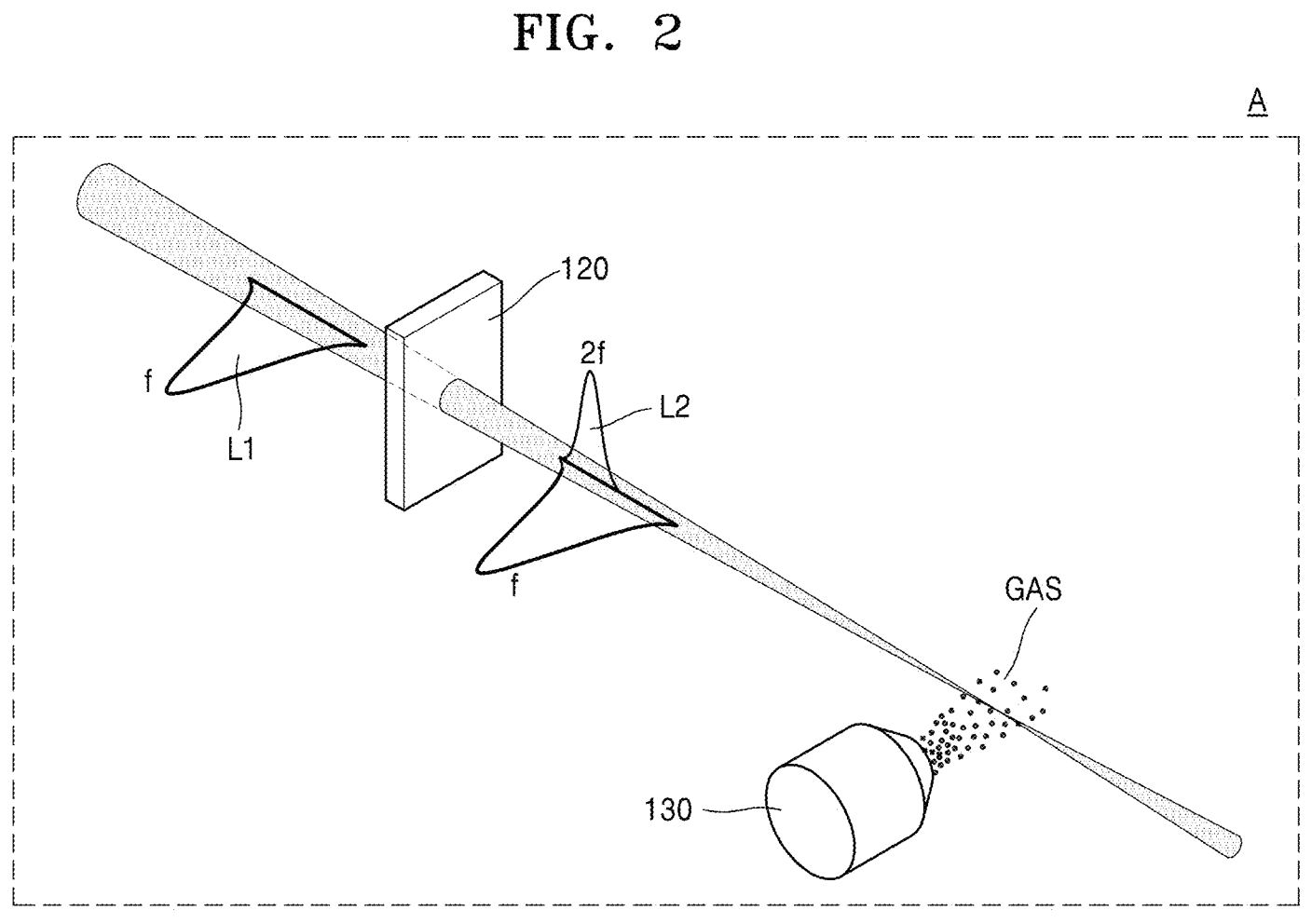

FIG. 2 is an enlarged conceptual diagram of a region A of FIG. 1.

Referring to FIG. 2 together with FIG. 1, a portion of the first beam L1 may be separated into the second beam L2 while passing through the SHG crystal 120. A portion of the first beam L1 may pass through the SHG crystal 120. In an embodiment, the first beam L1 and the second beam L2 may have overlapping paths. Similar to a Gaussian beam, each of the first beam L1 and the second beam L2 may have a space-intensity distribution with a center-peak intensity at a focal point within the gaseous medium GAS. Accordingly, near the focal point within the gaseous medium GAS, each of the first beam L1 and the second beam L2 may have a point-shaped intensity distribution.

The gas cell 130 may contain the gaseous medium GAS. The gaseous medium GAS may collide with the first beam L1 and the second beam L2. In this regard, the gaseous medium GAS may be an inert gas, such as helium (He), neon (Ne), argon (Ar), krypton (Kr), xenon (Xc), etc. Although not shown in the drawings, the gas cell 130 may have an inlet and an outlet opposite to the inlet, and the gaseous medium GAS may be supplied to the inlet of the gas cell 130 by a gas supply apparatus and discharged through the outlet of the gas cell 130.

Figure 3:
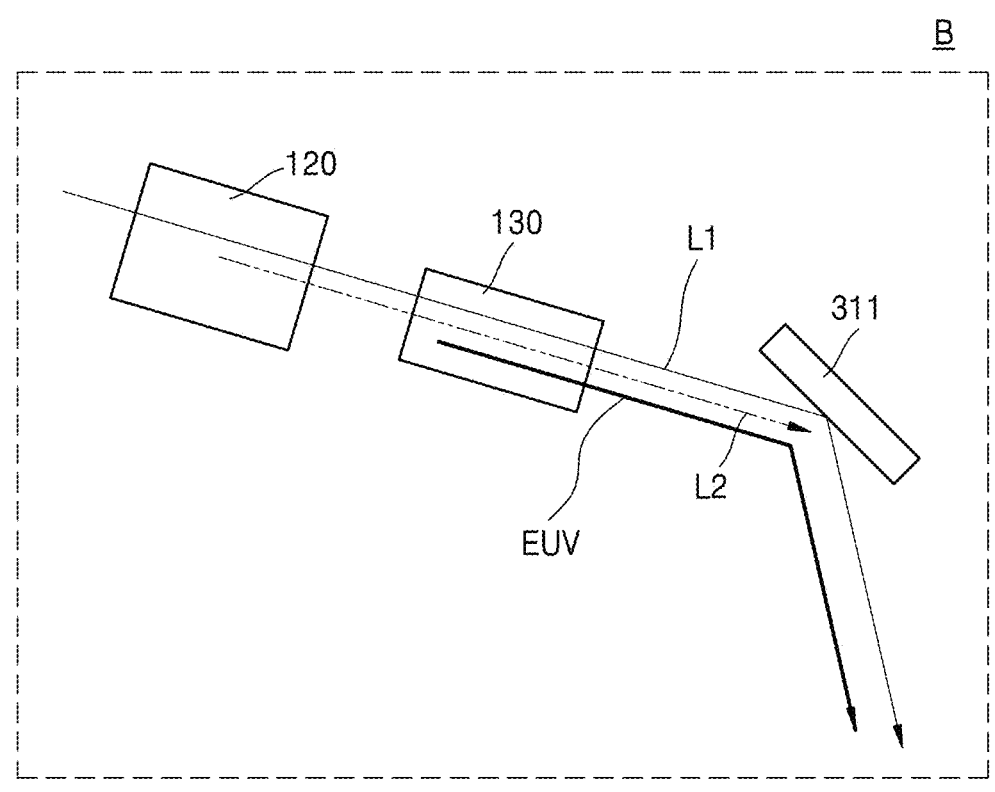
FIG. 3 is an enlarged conceptual diagram of a region B of FIG. 1.

Referring to FIG. 2 and FIG. 3, before being incident on the gaseous medium GAS, each of the first beam L1 and the second beam L2 may have a beam cross-section. According to embodiments, a divergence angle of the second beam L2 having a relatively short wavelength may be smaller than a divergence angle of the first beam L1 having a relatively long wavelength. According to embodiments, the first beam L1 and the second beam L2 may not overlap each other. According to embodiments, the beam cross-section of each of the first beam L1 and the second beam L2 may be approximately circular. According to embodiments, each of the first beam L1 and the second beam L2 having the beam cross-section may have an energy spatial distribution with a center-peak intensity. That is, the first beam L1 has a first space-intensity distribution with a first center-peak intensity at the focal point of the first beam L1, and the second beam L2 has a second space-intensity distribution with a second center-peak intensity at the focal point of the second beam L2. According to embodiments, each of the first beam L1 and the second beam L2 may have a spatially Gaussian distribution, but is not limited thereto.

When the magnitude of frequency of the first beam L1 is defined as f, the magnitude of frequency of the second beam L2 may be 2f, which is twice as large as the magnitude of frequency of the first beam L1. The wavelength band of the second beam L2 may be about half the range of the wavelength band of the first beam L1. A ratio of the intensity of each of the first beam L1 and the second beam L2 may be determined depending on the type of crystal forming the SHG crystal 120.

FIG. 3 is an enlarged conceptual diagram of a region B of FIG. 1.

Referring to FIG. 3 together with FIG. 1, the EUV filter 200 shown in the region B of FIG. 1 is omitted in FIG. 3.

The first beam L1 may pass through the SHG crystal 120 and the gas cell 130, and when the EUV filter 200 (of FIG. 1) is selectively omitted, the first beam L1 may be incident on the variable mirror module 311.

A portion of the first beam L1 that has passed through the SHG crystal 120 may be separated into the second beam L2. The second beam L2 may pass through the gas cell 130, and when the EUV filter 200 (of FIG. 1) is selectively omitted, the second beam L2 may be incident on the variable mirror module 311.

A portion of each of the first beam L1 and the second beam L2, which collides with the gaseous medium within the gas cell 130 while passing through the gas cell 130, may form the EUV light EUV. The EUV light EUV formed inside the gas cell 130 may be incident on the variable mirror module 311 regardless of the presence or absence of the EUV filter 200 (of FIG. 1).

The wavelength bands, which may be utilized when performing an inspection (e.g., of a semiconductor) may vary depending on the type of mirror mounted on the variable mirror module 311. For example, the type of mirror mounted on the variable mirror module 311 may selective reflect one or more of the first beam L1, the second beam L2, and the EUV light EUV.

Figure 4:
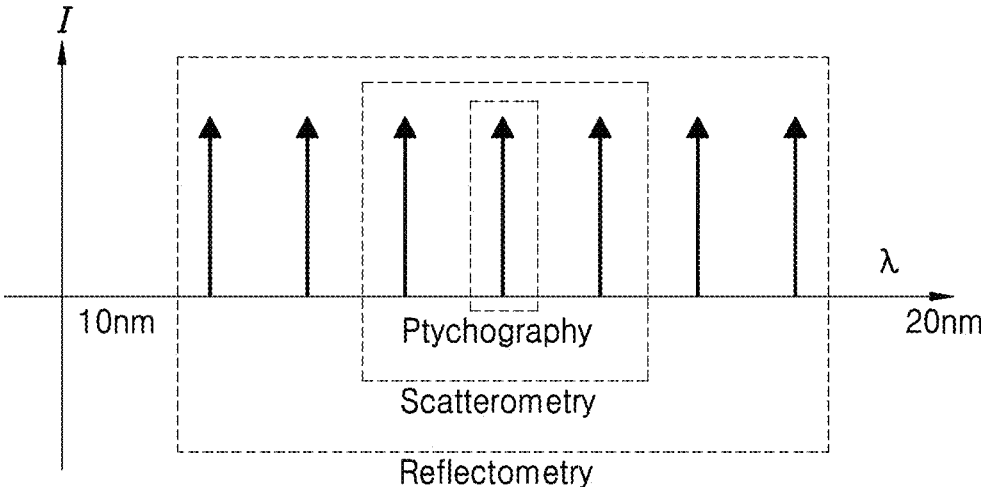
FIG. 4 is a conceptual diagram classifying inspections performed according to wavelengths, according to an embodiment.

FIG. 4 is a conceptual diagram classifying inspections performed according to a wavelength of light (e.g., wavelength bands), according to an embodiment. In FIG. 4, the intensities/of beams on the Y-axis are shown as constant according to wavelength 2 along the X-axis, but the intensities of the beams according to respective wavelengths may be different from each other.

In general, the EUV light used for lithography and semiconductor measurement may have a wavelength of 13.5 nm. Referring to FIG. 4 together with FIGS. 1 to 3, and in an embodiment, the EUV light EUV used for characterization or measurement may have a wavelength band of about 10 nm to about 20 nm. The wavelength band may be achieved via a plurality of beams having different wavelength bands.

When using a monochromatic light source in a wavelength band of about 10 nm to about 20 nm, the inspection portion 300 may perform ptychography. Ptychography may be also referred to as a coherent diffraction imaging (CDI). In ptychography, a computational imaging technique may be used for performing characterization or measurement using a monochromatic point light source. In an embodiment in which a monochromatic light source is used for ptychography, the mirror mounted on the variable mirror module 311 may be the narrow band mirror 311a (of FIG. 5).

When using a first portion of the wavelength band from about 13 nm to about 17 nm, the inspection portion 300 may perform scatterometry. Scatterometry may be used for performing characterization or measurement using diffractive optics. In an embodiment in which scatterometry is to be performed, the mirror mounted on the variable mirror module 311 may be the broadband mirror 311b (of FIG. 6).

When using a second portion of the wavelength band from about 11 nm to about 19 nm, the inspection portion 300 may perform reflectometry. Reflectometry may be used for performing characterization or measurement using reflective optics. In an embodiment in which reflectometry is to be performed, the mirror mounted on the variable mirror module 311 may be the broadband mirror 311b (of FIG. 6).

When the substrate W, which may be a sample to be measured, may be a flat multilayer thin-film sample, a repeating device structure sample, and/or a non-repeating step. Structure sample, ptychography, scatterometry, or reflectometry may be selected for performing characterization or measurement according to the structure and/or properties of the substrate W.

Figure 5:
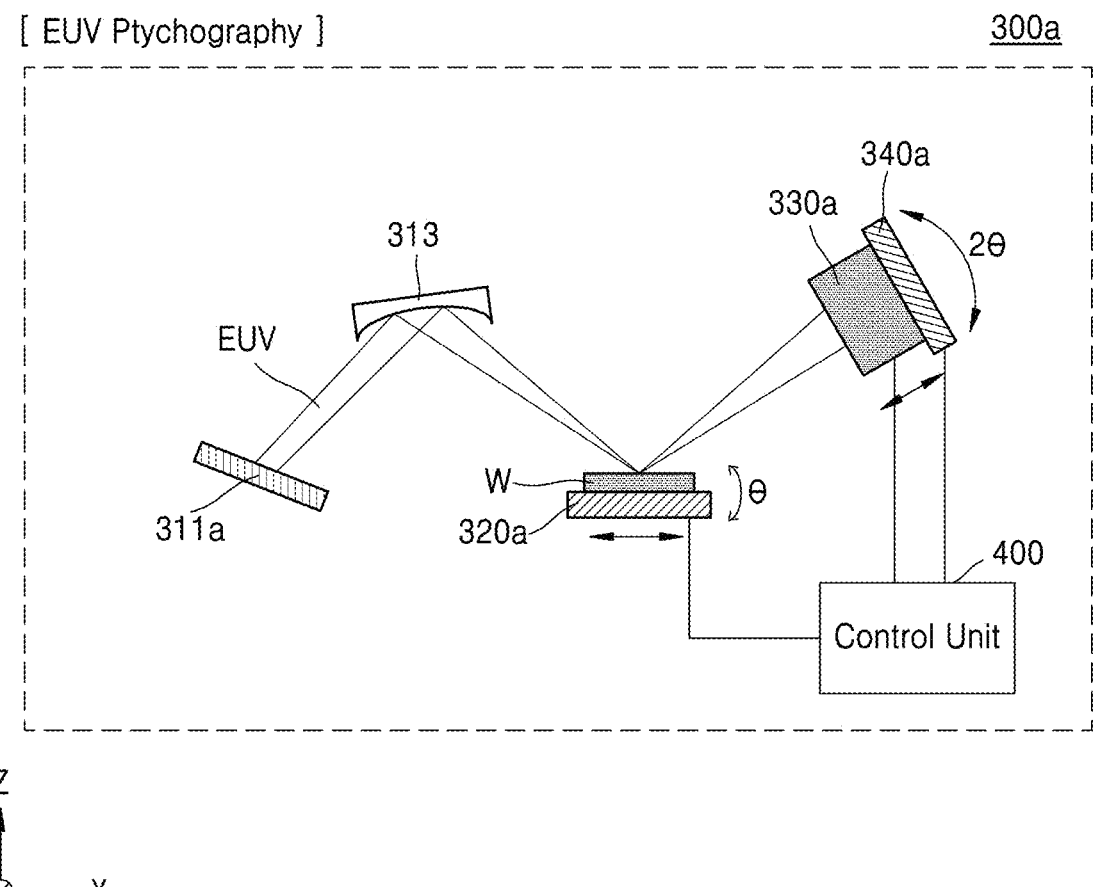
FIG. 5 is a conceptual diagram showing an inspection portion, which performs ptychography, according to an embodiment.

FIG. 5 is a conceptual diagram showing an inspection portion, which performs ptychography, according to an embodiment.

Referring to FIG. 5 together with FIGS. 1 to 4, an inspection portion 300a may include the narrow band mirror 311a mounted on the variable mirror module (not illustrated), the condensing mirror 313 configured to concentrate, on the substrate W, the EUV light EUV reflected from the narrow band mirror 311a, a sample stage 320a disposed below the substrate W, a detector apparatus 330a configured to detect light scattered from the substrate W, and a detector stage 340a that supports the detector apparatus 330a. The inspection portion 300a may perform ptychography by using a monochromatic light source in a wavelength band from about 10 nm to about 20 nm. The narrow band mirror 311a may be configured to reflect a wavelength band of the EUV light EUV having a wavelength band from about 10 nm to about 20 nm.

The sample stage 320a and the detector stage 340a may be configured to be movable in the first direction X, the second direction Y perpendicular to the first direction X, and the vertical direction Z perpendicular to the first direction X and the second direction Y, and the movement of the sample stage 320a and the detector stage 340a may be controlled by the control unit 400.

The sample stage 320a and the detector stage 340a may be configured to be rotatable along the axis of the second direction Y. In an embodiment, when the range in which the sample stage 320a rotates along the axis of the second direction Y is defined as θ, the detector stage 340a may rotate up to 2θ, which is twice as large as the range in which the sample stage 320a rotates along the axis of the second direction Y. Inspection may be improved by adjusting the rotation angle of each of the sample stage 320a and the detector stage 340a according to the thickness and properties of the substrate W. The rotation of the sample stage 320a and the detector stage 340a along the axis of the second direction Y may be controlled by the control unit 400.

Figure 6:
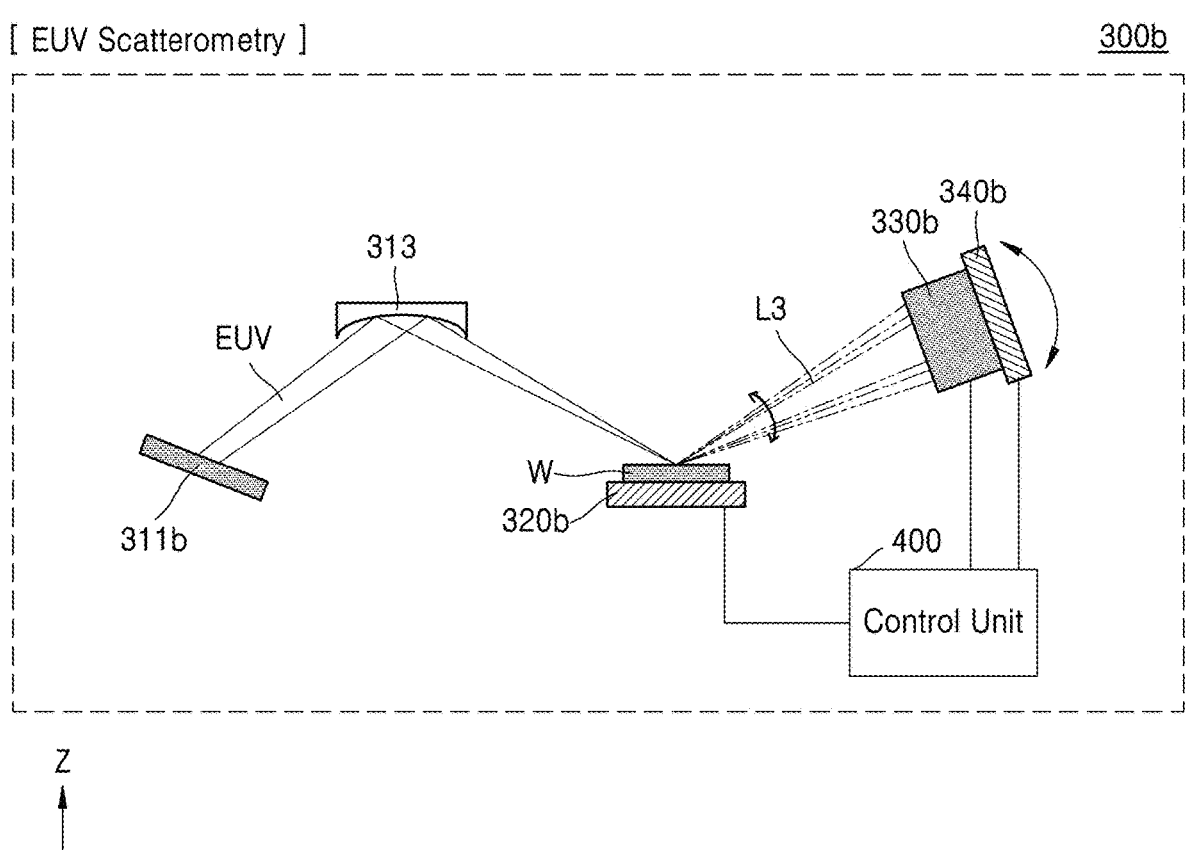
FIG. 6 is a conceptual diagram showing an inspection portion, which performs scatterometry, according to an embodiment.

FIG. 6 is a conceptual diagram showing an inspection portion, which performs scatterometry, according to an embodiment.

Referring to FIG. 6 together with FIGS. 1 to 5, an inspection portion 300b may include the broadband mirror 311b mounted on the variable mirror module (not illustrated), the condensing mirror 313 configured to concentrate, on the substrate W, the EUV light EUV reflected from the broadband mirror 311b, a sample stage 320b disposed below the substrate W, a detector apparatus 330b that detects light scattered from the substrate W, and a detector stage 340b that supports the detector apparatus 330b. The inspection portion 300b may perform scatterometry by using the first portion of the wavelength band from about 13 nm to about 17 nm. The broadband mirror 311b may be configured to reflect the second portion of the wavelength band from about 13 nm to about 17 nm.

The EUV light EUV irradiated on the upper surface of the substrate W may be diffracted into a third beam L3. The third beam L3 may have a fan-shaped scattering distribution. The angle at which the third beam L3 is scattered and distributed may vary depending on the thickness and properties of the substrate W. In order to measure the third beam L3 diffracted in a fan shape, the detector stage 340b may be configured to be rotatable along the axis of the second direction Y. In an embodiment, inspection may be improved by adjusting the rotation angle of the detector stage 340b according to the thickness and properties of the substrate W. The rotation of the detector stage 340b along the axis of the second direction Y may be controlled by the control unit 400. The detector apparatus 330b, which may be mounted on the detector stage 340b, may move in conjunction with the detector stage 340b. For example, the detector apparatus 330b may be oriented to detect at least a portion of the scattered light from the substrate W.

In an embodiment, the narrow band mirror 311a or the broadband mirror 311b may be mounted on the variable mirror module 311. The variable mirror module 311 may secure a mirror mounted thereon. For example, the variable mirror module 311 may be, for example, a fixed mount, a gimbal mount, an indexing mount, a pitch-adjustable flexure mount, a motorized flip mount, etc. In an embodiment, the variable mirror module 311 may be controllable (e.g., by the control unit 400) to selectively move a mirror into the path of the beam, e.g., the EUV light EUV.

Figure 7:
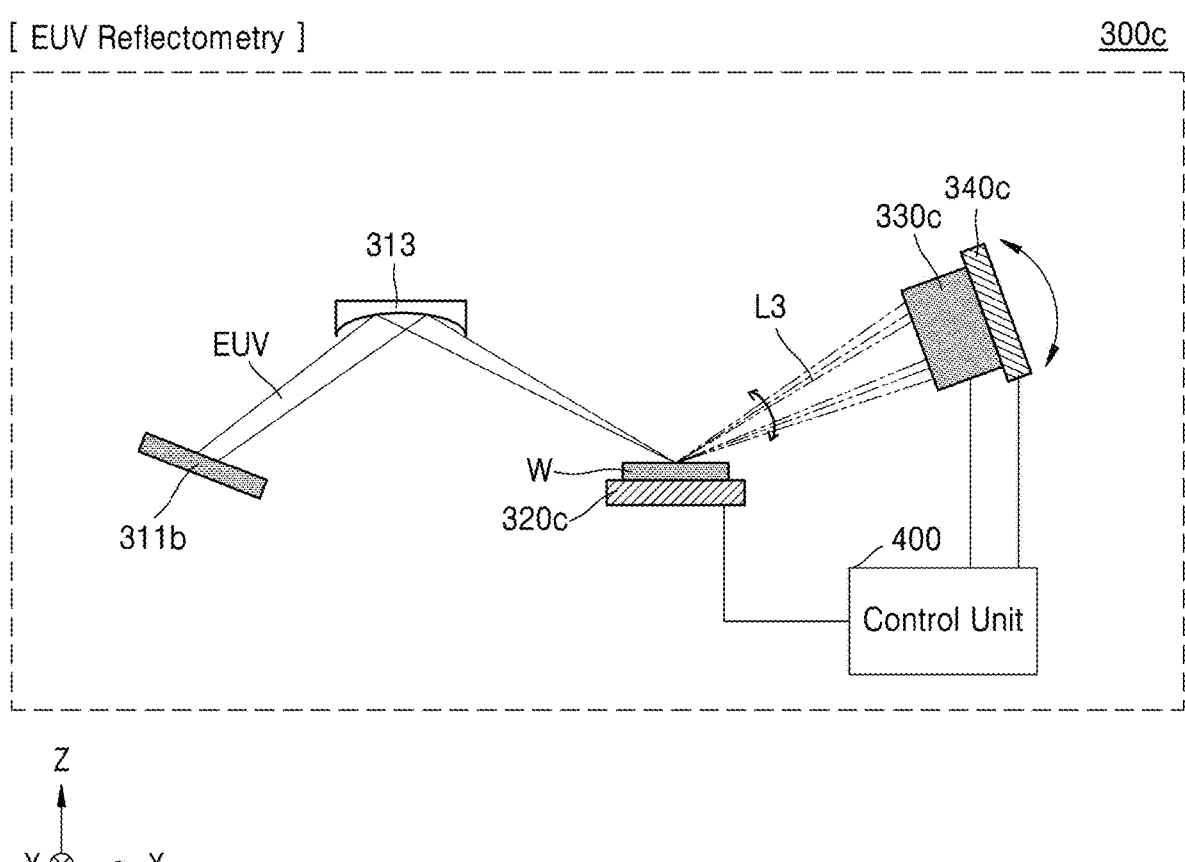
FIG. 7 is a conceptual diagram showing an inspection portion, which performs reflectometry, according to an embodiment.

FIG. 7 is a conceptual diagram showing an inspection portion, which performs reflectometry, according to an embodiment.

Referring to FIG. 7 together with FIGS. 1 to 6, an inspection portion 300c may include the broadband mirror 311b mounted on the variable mirror module, the condensing mirror 313 configured to concentrate, on the substrate W, the EUV light EUV reflected from the broadband mirror 311b, a sample stage 320c disposed below the substrate W, a detector apparatus 330c that detects light scattered from the substrate W, and a detector stage 340c that supports the detector apparatus 330c. The inspection portion 300c may perform reflectometry by using a broadband wavelength region range, for example, between about 10 nm and about 20 nm, or between about 11 nm and about 19 nm. The broadband mirror 311b may be configured to reflect a partial wavelength region range of about 10 nm to about 20 nm (for example, about 13 nm to about 17 nm).

The EUV light EUV irradiated on the upper surface of the substrate W may be reflected as the third beam L3. The reflected third beam L3 may have a fan-shaped scattering distribution. The angle at which the third beam L3 is scattered and distributed may vary depending on the thickness and properties of the substrate W. In order to measure the third beam L3 scattered in a fan shape, the detector stage 340c may be configured to be rotatable along the axis of the second direction Y. In an embodiment, inspection may be optimized by adjusting the rotation angle of the detector stage 340c according to the thickness and properties of the substrate W. The rotation of the detector stage 340c along the axis of the second direction Y may be controlled by the control unit 400. The detector apparatus 330c, which may be mounted on the detector stage 340c, may move in conjunction with the detector stage 340c. For example, the detector apparatus 330c may be oriented to detect at least a portion of the scattered light from the substrate W.

Although not shown in the drawings, in order to measure a specific direction of the third beam L3 as reflected light, a polarizing film may be disposed in a path of the third beam L3. In the case of the inspection portion 300c that performs reflectometry, a mode of the incident EUV light EUV may be a frequency comb mode (see graph (a) of FIG. 8), but also a continuum mode (see graph (b) of FIG. 8). In an embodiment, when performing reflectometry on the substrate W, the inspection portion 300c may measure the reflectance of the EUV light EUV incident on the substrate W.

Figure 8:
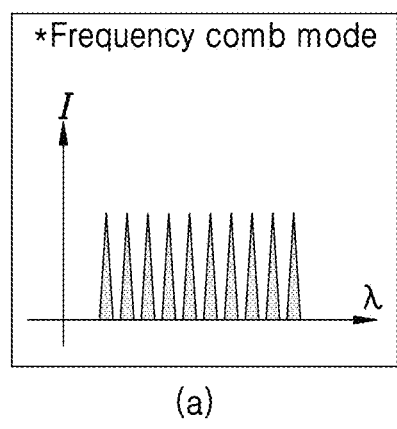
FIG. 8 illustrates graphs showing intensity according to wavelength with respect to a plurality of modes of beams emitted by a laser source according to an embodiment.
Figure 8:
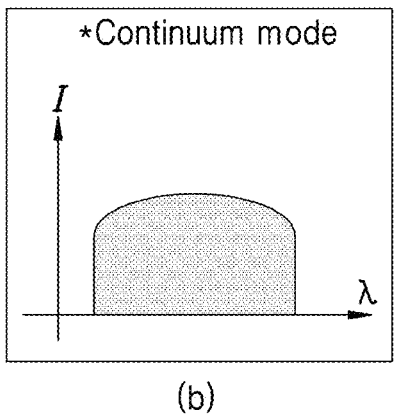
Figure 9:
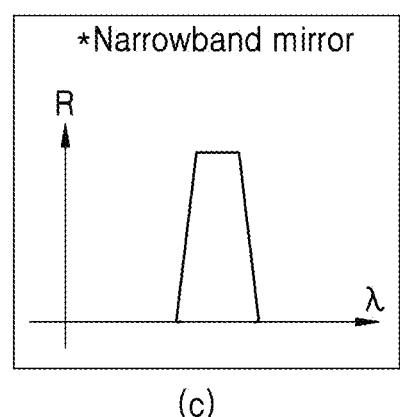
FIG. 9 illustrates graphs showing reflectance according to wavelength with respect to mirrors mounted on a variable mirror module, according to an embodiment.
Figure 9:
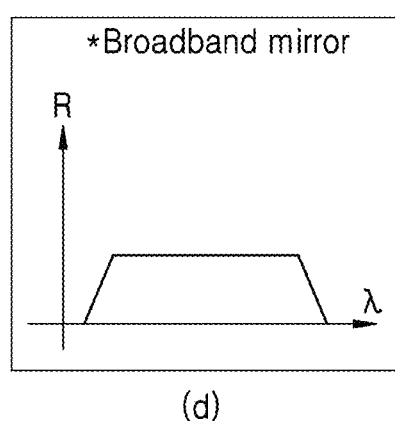
Figure 10:
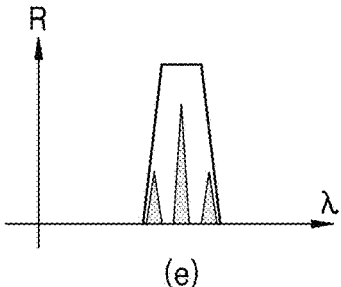
FIG. 10 illustrates graphs showing appearances of beams according to a method of performing inspection, according to an embodiment.
Figure 10:
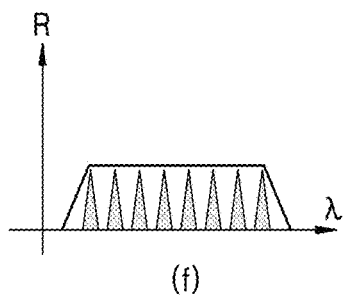
Figure 10:
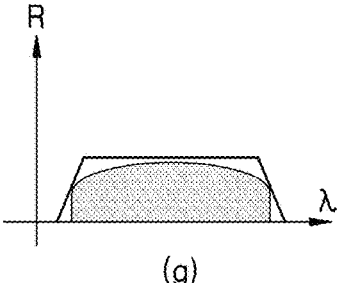

FIG. 8 illustrates graphs showing intensity according to wavelength with respect to a plurality of modes of beams emitted by a laser source according to an embodiment. FIG. 9 illustrates graphs showing reflectance/according to wavelength λ with respect to mirrors mounted on a variable mirror module, according to an embodiment. FIG. 10 illustrates graphs showing appearances of beams according to a method of performing inspection, according to an embodiment.

Referring to FIGS. 8 to 10 together with FIGS. 1 to 7, the laser source 101 may be configured to emit the first beam L1 in a mode of a plurality of modes. In an embodiment, the plurality of modes may be a frequency comb mode, which is a discontinuous pulse, as shown in graph (a) of FIG. 8 and a continuum mode as shown in graph (b) of FIG. 8. The continuum mode may have a certain intensity for all wavelength bands. The frequency comb mode may have a certain intensity only for a specific wavelength band. Accordingly, beams in various modes may be output from a light source. The first beam L1, the second beam L2, and the EUV light EUV may have different wavelength bands and different frequencies, and modes of the second beam L2 and the EUV light EUV may each be the same as a mode of the first beam L1.

Graph (c) of FIG. 9 shows reflectance of the narrow band mirror 311a for each wavelength band, and graph (d) of FIG. 9 shows reflectance of the broadband mirror 311b for each wavelength band. The width of a wavelength band reflected by the narrow band mirror 311a may be smaller than the width of a wavelength band reflected by the broadband mirror 311b. The reflectance of the narrow band mirror 311a may be greater than the reflectance of the broadband mirror 311b.

Referring to FIG. 10, graph (e) shows reflectance for each wavelength band when the EUV light EUV incident in the frequency comb mode, which is a discontinuous pulse, of graph (a) of FIG. 8 is reflected by the narrow band mirror 311a of graph (c) of FIG. 9. Graph (e) refers to a spectrum that may be used performing the ptychography of FIG. 5. Graph (f) shows reflectance for each wavelength when the EUV light EUV incident in the frequency comb mode, which is a discontinuous pulse, of graph (a) of FIG. 8 is reflected by the broadband mirror 311b of graph (d) of FIG. 9. Graph (f) refers to the case of performing the scatterometry of FIG. 6. Graph (g) shows reflectance for each wavelength band when the EUV light EUV incident in the continuum mode of graph (b) of FIG. 8 is reflected by the broadband mirror 311b of graph (d) of FIG. 9. Graph (g) refers to the case of performing the reflectometry of FIG. 7.

Figure 11:
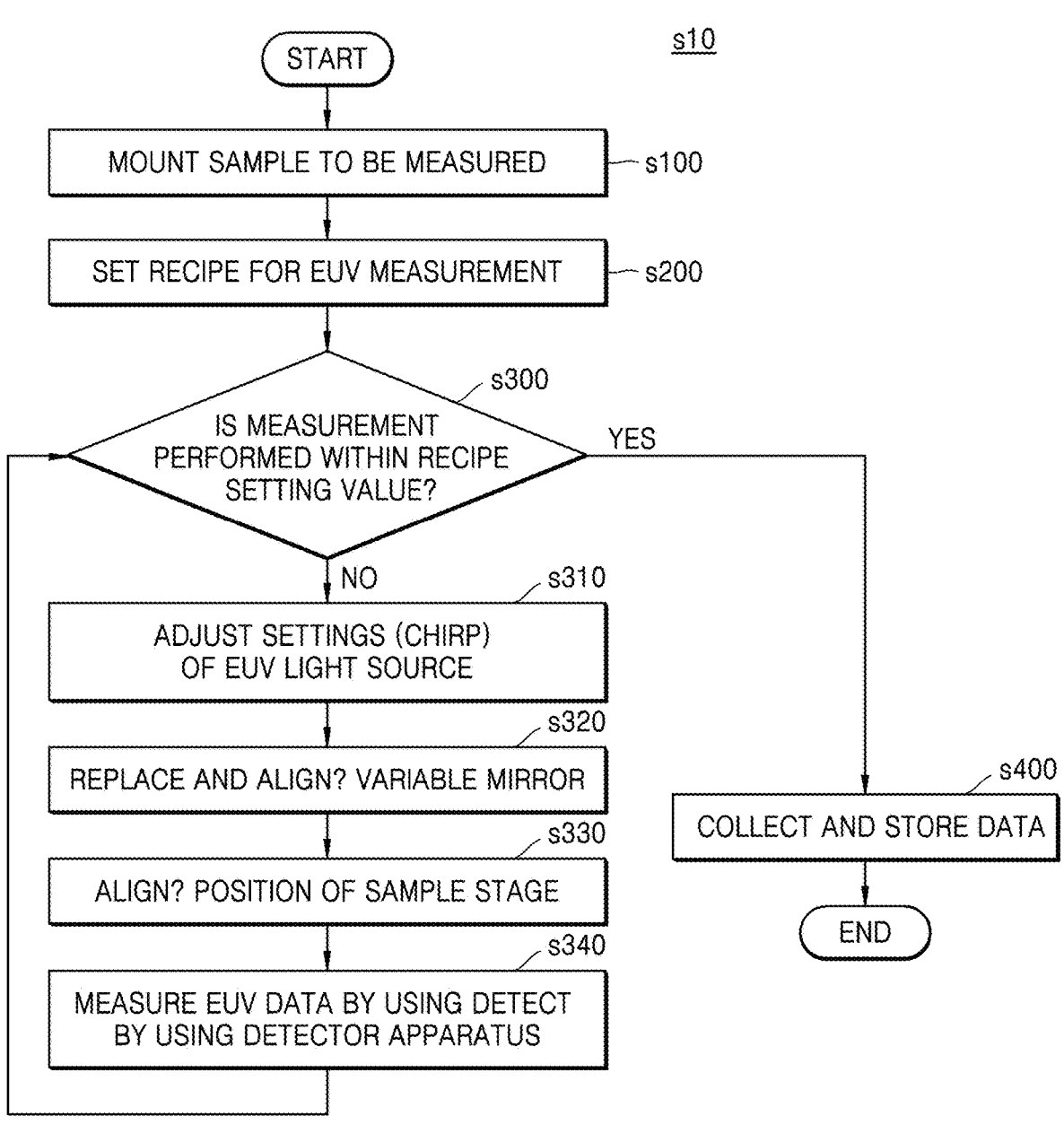
FIG. 11 is a flowchart showing a method of performing semiconductor inspection, according to an embodiment.

FIG. 11 is a flowchart showing a method of performing semiconductor inspection, according to an embodiment.

Referring to FIG. 11, a semiconductor inspection method s10 may include an operation (s100) of mounting a sample to be measured and an operation (s200) of setting a recipe for EUV measurement. In an embodiment, the sample to be measured may include: a flat multilayer thin-film sample (SiGe, ONO); BCAT, GBL, and DCC, as a repeating device structure sample; or a non-repeating step and structure sample. The recipe for EUV measurement may adjust one or more of the polarization angle, intensity, mode, or wavelength of a first beam. The semiconductor inspection method s10 may include an operation (s300) of determining whether the measurement has been performed within a recipe setting value and an operation (s400) of collecting and storing data when the measurement has been performed within the recipe setting value.

The semiconductor inspection method s10 may include an operation (s310) of adjusting the settings of an EUV light source when the measurement has not been performed within the recipe setting value. For example, referring to FIG. 8, in operation s310, a mode of a laser light source may be selected as a frequency comb mode, which is a discontinuous pulse, or a continuum mode.

The semiconductor inspection method s10 may include an operation (s320) of replacing and aligning a variable mirror when the measurement has not been performed within the recipe setting value. For example, referring to FIG. 9, in operation s320, the mirror mounted on the variable mirror module 311 of FIG. 1 may be selected as the narrow band mirror 311a of FIG. 5 or the broadband mirror 311b of FIG. 6.

The semiconductor inspection method s10 may include an operation (s330) of aligning the position of a sample stage. The positions of a sample stage and a detector stage may be aligned or rotated. A description thereof is described herein with reference to FIGS. 5 to 7, and repetitive descriptions thereof may be omitted.

The semiconductor inspection method s10 may include an operation (s340) of measuring EUV data by using a detector apparatus.

According to the inventive concept, the recipe may be changed in operation s310, operation s320, and/or operation s330 according to a variable value to be extracted as described above, and the measurement may be performed with a high degree of freedom (DOF) for a light source at operation s340.

Figure 12:
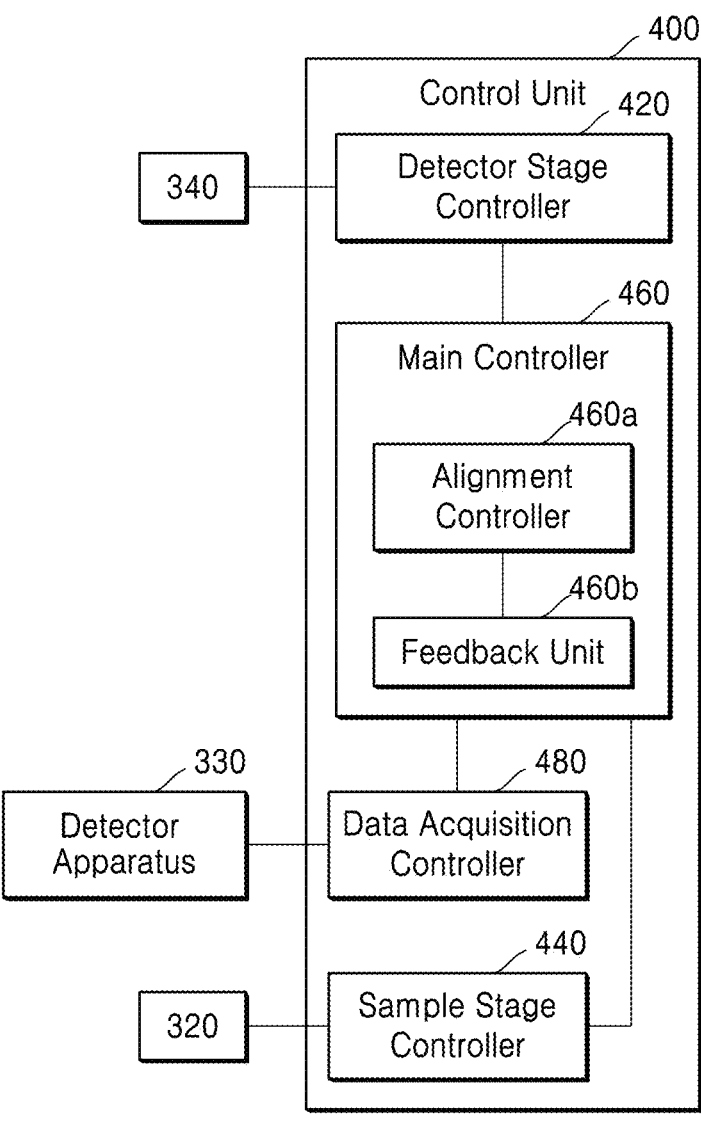
FIG. 12 is a diagram showing a control unit of FIG. 1 in detail, according to an embodiment.

FIG. 12 is a diagram showing the control unit 400 of FIG. 1 in detail, according to an embodiment.

The control unit 400 may include a detector stage controller 420, a sample stage controller 440, a main controller 460, and a data acquisition controller 480. The reliability of a process for inspecting the semiconductor inspection apparatus 10 shown in FIGS. 1 to 11 may be improved by controlling the detector stage 340 and the sample stage 320 via the control unit 400.

The detector stage controller 420 may control movement of the detector stage 340. In this regard, the movement of the detector stage 340 may include movement in one or more of an x direction, y direction, or z direction, and/or a rotation about one or more of an x-axis, y-axis, or z-axis.

The sample stage controller 440 may control movement of the sample stage 320. The movement of the sample stage 320 may also include movement in one or more of the x direction, y direction, or z direction, and/or rotation about one or more of the x-axis, y-axis, or z-axis.

The main controller 460 may include an alignment controller 460a and a feedback unit 460b. The alignment controller 460a may calculate a correction value of parameters of an overlay error. The correction value of the parameters of the overlay error may be calculated based on data on the parameters of the overlay error and correlation between the parameters of the overlay error. In this regard, the parameters of the overlay error may refer to parameters related to the overlay error between layers on an object to be exposed to EUV, for example, the substrate W. Hereinafter, a parameter of an overlay error may be referred to as an overlay parameter.

For reference, an overlay error may refer to a difference in overlap between an under layer and a current layer corresponding to an upper layer. In general, during an exposure process for the upper layer, the overlay error may be reduced by ensuring shots or exposures are as close to the under layer as possible based on an overlay mark of the under layer. When the overlay error is large, in other words, when a difference in relative position between the under layer and the current layer is large, the overlay error may have a negative impact on the performance of semiconductor devices being produced on the substrate W.

In the semiconductor inspection apparatus 10 according to an example embodiment, for example, the alignment controller 460a may calculate a correction value of a second overlay parameter from data on a first overlay parameter, based on correlation between the first overlay parameter and the second overlay parameter. The feedback unit 460b may feed back the calculated correction value of the overlay parameters to the detector stage controller 420 and/or the sample stage controller 440. The detector stage controller 420 and/or the sample stage controller 440 may control movement of the detector stage 340 and/or the sample stage 320, based on the correction value of the overlay parameters. As a specific example, the feedback unit 460b may feed back the calculated correction value of the second overlay parameter to the detector stage controller 420, and the detector stage controller 420 may control rotation of the detector stage 340 about the x-axis, based on the correction value of the second overlay parameter.

The main controller 460 may control the detector stage controller 420 and the sample stage controller 440. For example, the main controller 460 may control the detector stage controller 420 and the sample stage controller 440 such that the detector stage 340 and the sample stage 320 may be synchronized in a scan direction during an exposure process.

In addition, although not shown in FIG. 12, the main controller 460 may further include various components for control in an EUV exposure process. For example, the main controller 460 may include a focal point controller, a data storage unit, an exposure processing unit, etc.

The focal point controller may obtain a focus correction value by comparing a measured focus offset with a specified focus offset, and may transmit the focus correction value to the sample stage controller 440 via the feedback unit 460b such that the sample stage controller 440 controls movement of the sample stage 320 in the z direction, etc. The data storage unit may store data on a correction value of overlay parameters, correlation between the overlay parameters, a focus correction value, etc., which may be obtained via the alignment controller 460a or the focal point controller. After movement of the detector stage 340 and the sample stage 320 is controlled via the alignment controller 460a or the focal point controller, the exposure processing unit may perform an exposure process while synchronizing the detector stage 340 and the sample stage 320 in a scan direction via the main controller 460.

The data acquisition controller 480 may obtain data on overlay parameters via the detector apparatus 330 and transmit the data to the main controller 460. Specifically, the detector apparatus 330 may measure an overlay error for patterns on a substrate, and the data acquisition controller 480 may receive data on the overlay error from the detector apparatus 330. As a result, the data acquisition controller 480 may obtain data on overlay parameters from the detector apparatus 330 and transmit the data to the main controller 460. In the semiconductor inspection apparatus 10 according to an example embodiment, the data acquisition controller 480 may, for example, obtain data on the first overlay parameter via the detector apparatus 330 and transmit the data to the alignment controller 460a of the main controller 460.

The semiconductor inspection apparatus 10 according to an example embodiment may correct the first overlay parameter by correcting the second overlay parameter, wherein the first overlay parameter and the second overlay parameter are correlated, and accordingly, may significantly reduce overlay errors in an EUV exposure process. Meanwhile, physical operation may refer to the physical operation of a scanner, that is, an exposure apparatus, of correcting an overlay error. For example, the physical operation may include various methods, such as applying pressure or tilt to a lens or mirror within an optical system or moving the lens or mirror, moving a mask via the detector stage 340, or moving the object to be exposed to EUV via the sample stage 320, heating the object to be exposed to EUV, etc.

While the inventive concept has been particularly shown and described with reference to embodiments thereof, it will be understood that various changes in form and details may be made therein without departing from the spirit and scope of the following claims.

What is claimed is:

1. A semiconductor inspection apparatus comprising:
a light source portion configured to output a first beam;
an extreme-ultraviolet filter disposed in a path of the first beam output from the light source portion, and configured to separate extreme-ultraviolet light from the first beam; and
an inspection portion comprising a detector apparatus configured detect scattered light,
wherein the light source portion comprises:
a laser source configured to output the first beam;
a second-harmonic generation crystal disposed in the path of the first beam and configured to separate, from the first beam, a second beam having a different wavelength band from the first beam; and
a gas cell disposed in the path of the first beam and a path of the second beam and configured to supply a gas in the path of the first beam and the path of the second beam to generate the extreme-ultraviolet light,
wherein the inspection portion further comprises an inspection portion optical system comprising a variable mirror module disposed in a path of the extreme-ultraviolet light.

2. The semiconductor inspection apparatus of claim 1, wherein the laser source is configured to output the first beam in a mode selected from a plurality of modes, and
the plurality of modes comprise a frequency comb mode, which is a discontinuous pulse, and a continuum mode.

3. The semiconductor inspection apparatus of claim 2, wherein the variable mirror module mounts a narrow band mirror, and when the laser source outputs the first beam in the frequency comb mode, the inspection portion is configured to perform ptychography on the scattered light scattered from a substrate.

4. The semiconductor inspection apparatus of claim 2, wherein the variable mirror module mounts a broadband mirror, and when the laser source outputs the first beam in the frequency comb mode, the inspection portion is configured to perform scatterometry on the scattered light scattered from a substrate.

5. The semiconductor inspection apparatus of claim 2, wherein the variable mirror module mounts a broadband mirror, and when the laser source outputs the first beam in the continuum mode, the inspection portion is configured to perform reflectometry on the scattered light scattered from a substrate.

6. The semiconductor inspection apparatus of claim 2, wherein modes of the second beam and the extreme-ultraviolet light each match a mode of the first beam.

7. The semiconductor inspection apparatus of claim 1, wherein the light source portion further comprises a light source portion optical system disposed in the path of the first beam, and the light source portion optical system comprises:
a first mirror disposed in the path of the first beam; and
a second mirror configured to concentrate, on the gas cell, the first beam reflected from the first mirror.

8. The semiconductor inspection apparatus of claim 7, wherein the first mirror is configured to polarize the first beam.

9. The semiconductor inspection apparatus of claim 1, wherein the inspection portion optical system further comprises a condensing mirror configured to concentrate, on a substrate, the extreme-ultraviolet light reflected from the variable mirror module.

10. The semiconductor inspection apparatus of claim 1, wherein the inspection portion further comprises:
a sample stage on which a substrate is disposed, wherein the scattered light is scattered by the substrate;
a detector stage on which the detector apparatus is disposed; and
a control unit configured to control the sample stage and the detector stage.

11. The semiconductor inspection apparatus of claim 1, wherein a wavelength band of the first beam is about twice a range of a wavelength band of the second beam, and
a wavelength band of the extreme-ultraviolet light separated by the extreme-ultraviolet filter is at least about 10 nanometers and not more than about 20 nanometers.

12. A semiconductor inspection apparatus comprising:
a laser source configured to output a first beam having a first wavelength band;
a second-harmonic generation crystal configured to separate, from the first beam, a second beam having a second wavelength band that having about half a range of the first wavelength band;
a gas cell configured to contain a gaseous medium in a path of the first beam and the second beam;
an extreme-ultraviolet filter configured to separate extreme-ultraviolet light from the first beam and the second beam, which have passed through the gas cell;
a variable mirror module disposed in a path of the extreme-ultraviolet light;
a condensing mirror configured to concentrate, on an upper surface of a substrate, the extreme-ultraviolet light incident from the variable mirror module; and
a detector apparatus configured to detect at least a portion of the extreme-ultraviolet light scattered from the substrate,
wherein the laser source is configured to output the first beam in a mode selected from a plurality of modes, and the plurality of modes comprise a frequency comb mode, which is a discontinuous pulse, and a continuum mode.

13. The semiconductor inspection apparatus of claim 12, further comprising a light source portion optical system disposed in the path of the first beam,
wherein the light source portion optical system comprises:
a first mirror configured to polarize the first beam; and
a second mirror configured to scan, into the gas cell, the first beam reflected from the first mirror,
each of the first beam and the second beam is focused light, and
a focal point of each of the first beam and the second beam is within the gas cell containing the gaseous medium.

14. The semiconductor inspection apparatus of claim 13, wherein the first beam has a first space-intensity distribution with a first center-peak intensity at the focal point of the first beam, and the second beam has a second space-intensity distribution with a second center-peak intensity at the focal point of the second beam.

15. The semiconductor inspection apparatus of claim 12, wherein a mirror mounted on the variable mirror module comprises a narrow band mirror or a broadband mirror.

16. The semiconductor inspection apparatus of claim 15, wherein an inspection portion comprising the detector apparatus is configured to perform a process selected from ptychography, scatterometry, or reflectometry on the substrate, and the mirror mounted on the variable mirror module and the mode of the laser source outputting the first beam are selected according to the process.

17. The semiconductor inspection apparatus of claim 15, wherein a width of a wavelength band reflected by the narrow band mirror is smaller than a width of a wavelength band reflected by the broadband mirror, and
a reflectance of the narrow band mirror is greater than a reflectance of the broadband mirror.

18. The semiconductor inspection apparatus of claim 12, further comprising:
a sample stage on which the substrate is disposed;
a detector stage on which the detector apparatus is disposed; and
a control unit configured to control the sample stage and the detector stage,
wherein the sample stage and the detector stage are each configured to be movable in a first direction, a second direction perpendicular to the first direction, and a vertical direction perpendicular to the first direction and the second direction.

19. The semiconductor inspection apparatus of claim 18, wherein the sample stage and the detector stage are each configured to be rotatable along an axis of the second direction.

20. A semiconductor inspection apparatus comprising:
a light source portion configured to output a plurality of light beams;
an extreme-ultraviolet filter disposed in a path of the plurality of light beams output from the light source portion, and configured to separate extreme-ultraviolet light from the plurality of light beams; and
an inspection portion comprising a condensing mirror configured to concentrate the extreme-ultraviolet light on a substrate and a detector apparatus configured to detect light scattered from the substrate,
wherein the light source portion comprises:
a laser source configured to output a first beam having a first wavelength band;
a second-harmonic generation crystal configured to separate, from the first beam, a second beam having a second wavelength band that is half of the first wavelength band;

a gas cell containing a gaseous medium disposed in a path the first beam and the second beam to generate the extreme-ultraviolet light; and a light source portion optical system disposed in a path of the first beam, wherein the light source portion optical system comprises:

a first mirror configured to polarize the first beam; and a second mirror configured to scan, into the gaseous medium, the first beam reflected from the first mirror, the inspection portion further comprises:

a sample stage on which the substrate is disposed;

a detector stage on which the detector apparatus is disposed;

a control unit configured to control the sample stage and the detector stage; and a variable mirror module disposed in a path of the extreme-ultraviolet light, wherein the sample stage and the detector stage are each configured to be movable in a first direction, a second direction perpendicular to the first direction, and a vertical direction perpendicular to the first direction and the second direction, a mirror mounted on the variable mirror module comprises either a narrow band mirror or a broadband mirror, and the extreme-ultraviolet light separated by the extreme-ultraviolet filter has a wavelength band of between about 10 nanometers and about 20 nanometers and has a period between about 10 femtoseconds and about 90 femtoseconds.

* * * * *